United States Patent
Lee et al.

(10) Patent No.: US 8,422,124 B2
(45) Date of Patent: Apr. 16, 2013

(54) SEED LIGHT MODULE FOR PASSIVE OPTICAL NETWORK

(75) Inventors: Han-hyub Lee, Daejeon-si (KR); Byoung-whi Kim, Daejeon-si (KR); Jea-hoon Yu, Daejeon-si (KR); Mahn Yong Park, Daejeon-si (KR); Jai-sang Koh, Gwangju-si (KR)

(73) Assignee: Electronics and Telecommunications Research Institute (KR)

( * ) Notice: Subject to any disclaimer, the term of this patent is extended or adjusted under 35 U.S.C. 154(b) by 620 days.

(21) Appl. No.: 12/553,914

(22) Filed: Sep. 3, 2009

(65) Prior Publication Data

US 2010/0150188 A1 Jun. 17, 2010

(30) Foreign Application Priority Data

Dec. 15, 2008 (KR) .................. 10-2008-0127263

(51) Int. Cl.
*H04B 10/17* (2006.01)
*H01S 5/00* (2006.01)
*H04B 10/12* (2006.01)

(52) U.S. Cl.
USPC .................. 359/349; 359/341.1; 359/344

(58) Field of Classification Search ............... 359/341.1, 359/344, 349
See application file for complete search history.

(56) References Cited

U.S. PATENT DOCUMENTS

| | | | | |
|---|---|---|---|---|
| 5,200,964 A * | 4/1993 | Huber | | 372/26 |
| 5,872,650 A * | 2/1999 | Lee et al. | | 359/337.13 |
| 6,181,467 B1 * | 1/2001 | Jung et al. | | 359/341.31 |
| 6,404,539 B1 * | 6/2002 | Kotrotsios et al. | | 359/341.1 |
| 6,404,541 B2 * | 6/2002 | Atieh | | 359/341.1 |
| 6,658,189 B2 * | 12/2003 | Ajima et al. | | 385/123 |
| 6,678,087 B1 * | 1/2004 | Masuda et al. | | 359/334 |
| 2002/0131695 A1 * | 9/2002 | Masuda et al. | | 385/27 |

FOREIGN PATENT DOCUMENTS

| | | |
|---|---|---|
| KR | 10-2002-0000406 | 1/2002 |
| KR | 10-2005-0067873 | 7/2005 |
| KR | 10-2006-0042486 A | 5/2006 |
| KR | 10-2007-0025885 A | 3/2007 |
| KR | 10-2007-0115006 A | 12/2007 |
| WO | WO 2007/139330 A1 | 12/2007 |

OTHER PUBLICATIONS

Lee, W., et al., "Bidirectional WDM-PON Based on Gain-Saturated Reflective Semiconductor Optical Amplifiers," IEEE Photonics Technology Letters, vol. 17, No. 11 (Nov. 2005) pp. 2460-2462.
Lee, W., et al , "Noise Suppression of Spectrum-Sliced WDM-PON Light Sources Using FP-LD," *ETRI Journal*, vol, 27, No. 2, Apr. 2005, pp. 334-336.

* cited by examiner

*Primary Examiner* — Eric Bolda
(74) *Attorney, Agent, or Firm* — Blakely, Sokoloff, Taylor & Zafman

(57) ABSTRACT

A spectrum-sliced seed light module for a wavelength division multiplexing passive optical network (WDM PON) is provided. The seed light module includes an optical amplifier to amplify seed light, an optical wavelength filter to transmit broadband light, which is output in opposite direction to an output direction of the seed light, at periodic frequency intervals, and a reflective mirror to reflect light which is spectrum-sliced through the optical wavelength filter to the optical wavelength filter.

9 Claims, 6 Drawing Sheets

SEED LIGHT MODULE FOR PASSIVE OPTICAL NETWORK

CROSS-REFERENCE TO RELATED APPLICATION

This application claims the benefit under 35 U.S.C. §119 (a) of Korean Patent Application No. 10-2008-0127263, filed on Dec. 15, 2008, the disclosure of which is incorporated by reference in its entirety for all purposes.

BACKGROUND

1. Field

The following description relates to a passive optical network and, more particularly, to a spectrum-sliced seed light module for a wavelength division multiplexing passive optical network (WDM PON).

2. Description of the Related Art

A dense wavelength division multiplexing passive optical network (WDM PON) gains notice as a next-generation optical network. Above all, in WDM PON technology, an optical transmitter module has to be independent of wavelengths even though it uses multiple optical wavelengths. WDM PON technologies satisfying such requirement are under study worldwide. Wavelength-locking WDM PON and wavelength-reuse WDM PON are currently commercially available WDM PONs.

For wavelength-locking WDM PON, when seed light is injected to a Fabry-Perot laser diode (FP-LD), light with the injected wavelengths is amplified in the FP-LD while light with the other wavelengths is suppressed. In this case, a broadband light source (BLS) is used as a seed light source. In the wavelength-locking scheme, two kinds of BLSs are installed in a central office: one BLS provides seed light to a FP-LD located in an optical line termination (OLT) for the central office; the other provides seed light to a FP-LD incorporated in an optical network unit (ONU) located at the customer premises. Light from the BLS is spectrum-sliced while passing through a WDM MUX incorporated in an OLT and a WDM MUX incorporated in a remote node (RN). The spectrum-sliced seed light is injected to the FP-LD.

For wavelength-reuse WDM PON, a reflective semiconductor optical amplifier (RSOA) is used as a communication light source. When an optical signal including downstream data is sent from an OLT to an ONU, RSOA in the ONU removes the downstream data from the optical signal; the optical signal is converted to pseudo continuous wave (CW) light. The converted light is modulated into upstream data and sent to the OLT for the central office. That is, the modulated optical signal sent from the OLT to the ONU provides seed light to the RSOA incorporated in the ONU.

On the other hand, seed light also needs to be provided to a RSOA incorporated in the OLT. In this case, an external light source is typically used. A BLS is used as an external seed light source. Also in wavelength-reuse scheme, light from the BLS is spectrum-sliced while passing through a WDM MUX incorporated in the OLT. The spectrum-sliced seed light is injected to the RSOA.

Since light from the BLS is spectrum-sliced while passing through WDM MUX on a communication link and is injected to the FP-LD or RSOA, the above-mentioned conventional schemes introduce a loss in optical power during the spectrum-slicing process. As a result, the seed light power needs to be boosted above a predetermined level.

SUMMARY

Accordingly, in one aspect, there is provided a spectrum-sliced seed light module capable of efficiently operating an optical line termination (OLT) by minimizing a loss in optical power during a spectrum-slicing process performed by a WDM MUX on a communication link of a wavelength division multiplexing passive optical network (WDM PON).

In one general aspect, there is provided a seed light module for a passive optical network. The seed light module includes an optical amplifier to amplify seed light, an optical wavelength filter to transmit broadband light, which is output in opposite direction to an output direction of the seed light, at periodic frequency intervals, and a reflective mirror to reflect light which is spectrum-sliced through the optical wavelength filter to the optical wavelength filter.

The seed light module may further include a gain flattening filter disposed between the optical wavelength filter and the reflective mirror to flatten intensity of signals which are output as the seed light by adjusting a loss in each channel.

The seed light module may further include a band-pass filter disposed between the gain flattening filter and the optical wavelength filter to adjust a number of channels of the seed light by transmitting only a specific frequency band. The seed light module may further include the band-pass filter but not include the gain flattening filter.

The optical amplifier may be a fiber-optic amplifier and include an optical fiber made of an optical amplifying material; a pump light source to inject external light to the optical fiber to generate a carrier; and an optical coupler to guide light of the pump light source to the optical fiber.

The optical amplifier may be a semiconductor optical amplifier instead of the fiber-optic amplifier.

In another general aspect, there is provided a seed light module for a passive optical network. The seed light module includes an optical amplifier to amplify seed light, an optical wavelength filter to transmit broadband light, which is output in opposite direction to an output direction of the seed light, at periodic frequency intervals, and an optical circulating element disposed between the optical wavelength filter and the optical amplifier to circulate light which is spectrum-sliced through the optical wavelength filter to the optical amplifier and forward broadband light from the optical amplifier to the optical wavelength filter.

The seed light module may include the gain flattening filter and/or the band-pass filter. The seed light module may further include an additional optical amplifier at its output end.

However, other features and aspects will be apparent from the following description, the drawings, and the claims.

BRIEF DESCRIPTION OF THE DRAWINGS

Throughout the drawings and the detailed description, unless otherwise described, the same drawing reference numbers refer to the same elements, features, and structures. The relative size and depiction of these elements may be exaggerated for clarity, illustration, and convenience.

DETAILED DESCRIPTION

The detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions are omitted to increase clarity and conciseness.

Figure 1:
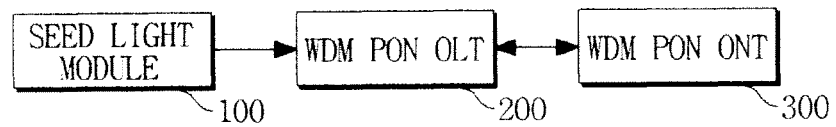
FIG. 1 is a block diagram of an exemplary wavelength division multiplexing passive optical network (WDM PON) system including a seed light module 100 with spectrum-sliced continuous optical output characteristic.

FIG. 1 is a block diagram of an exemplary wavelength division multiplexing passive optical network (WDM PON) system including a seed light module with spectrum-sliced continuous optical output characteristic.

Like a typical WDM PON system, in the exemplary WDM PON system, spectrum-sliced light is output from a seed light module 100, is input to a WDM PON OLT 200, is converted to a downstream signal in the OLT 200 and is transmitted to a WDM PON ONT 300 through an optical path.

The seed light module 100 will now be described in detail with reference to FIG. 1.

Figure 2:
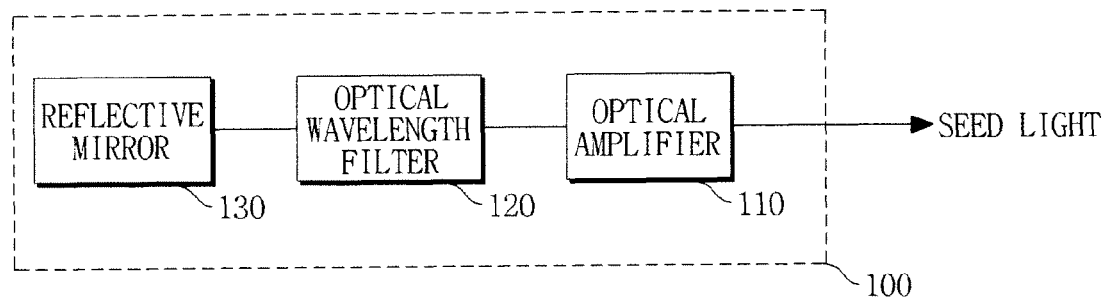
FIG. 2 is a block diagram of the seed light module 100 in FIG. 1.
Figure 3:
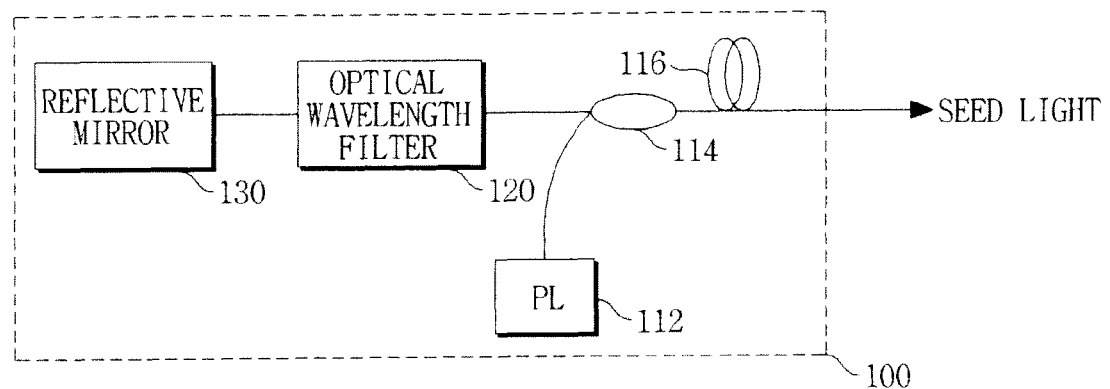
FIG. 3 is a view illustrating an optical amplifier 110 in FIG. 2.
Figure 4:
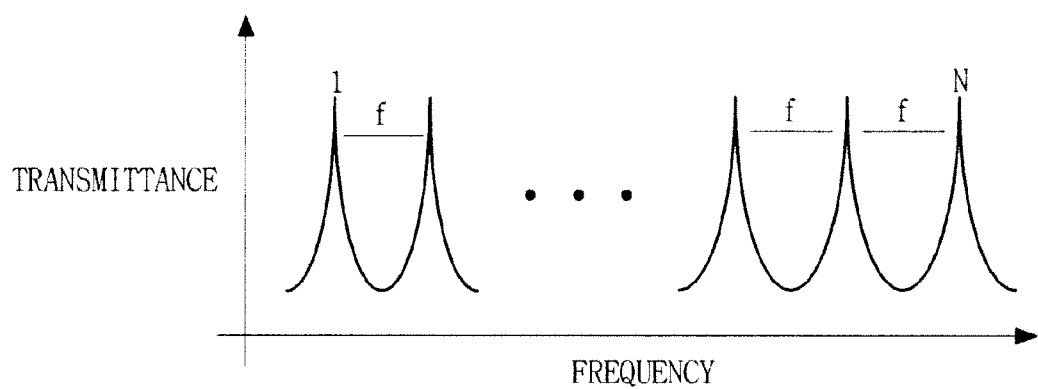
FIG. 4 illustrates a transmission characteristic graph of a Fabry-Perot interferometer which is an example of an optical wavelength filter 120 in FIGS. 2 and 3.

FIG. 2 is a block diagram of the seed light module 100 in FIG. 1. FIG. 3 is a view illustrating an optical amplifier 110 in FIG. 2. FIG. 4 illustrates a transmission characteristic graph of a Fabry-Perot interferometer which is an example of an optical wavelength filter 120 in FIGS. 2 and 3.

As shown in FIG. 1, the seed light module 100 includes an optical amplifier 110, an optical wavelength filter 120, and a reflective mirror 130. The optical amplifier 110 amplifies seed light. The optical wavelength filter 120 transmits at periodic frequency intervals therethrough broadband light which is output in an opposite direction to that of the seed light. The reflective mirror 130 reflects light, which is spectrum-sliced through the optical wavelength filter 120, to the optical wavelength filter 120.

The optical amplifier 110 may be a semiconductor optical amplifier, or a fiber-optic amplifier as shown in FIG. 3. The fiber-optic amplifier 110 includes an erbium-doped fiber (EDF) 116, a pump light source (PL) 112, and an optical coupler 114. The PL 112 injects external light into the EDF 116 to generate a carrier. The optical coupler 114 is used to guide the light from the PL 112 to the optical fiber 116.

The operation of the seed light module 100 will be described in detail with reference to FIGS. 3 and 4 illustrating the seed light module 100 employing the fiber-optic amplifier.

When light is entered by the pump light source 112, spontaneous emission light is emitted through the EDF 116 in the opposite direction (left) to the output direction (right) of the seed light. The spontaneous emission light which is emitted in the left direction continuously in a wide wavelength range enters the optical wavelength filter 120 which is in front of the optical amplifier 110. The broadband light input to one end of the optical wavelength filter 120 is spectrum-sliced at periodic frequency intervals (f), as shown in FIG. 4, according to a periodic light transmission characteristic of the optical wavelength filter 120 and is output from the other end. The optical wavelength filter 120 may adjust the interval and width of the transmitted spectrum according to the output characteristic of seed light which is needed in WDM PON. The optical wavelength filter 120 may be implemented from a Fabry-Perot interferometer using an interference occurring in an optical system having a pair of reflective mirrors. The wavelength-divided light from the optical wavelength filter 120 is reflected by the reflective mirror 130 and is re-entered to the optical fiber 116 through the optical wavelength filter 120.

Accordingly, in case of the seed light module 100 thus configured, since the spontaneous emission light generated in the fiber-optic amplifier 110 is spectrum-sliced, re-entered to the optical fiber 116, and provided as seed light, a loss in optical power caused by the spectrum slicing which occurs in the WDM MUX in the OLT may be avoided. As a result, it is possible to efficiently operate the WDM PON OLT.

Figure 5:
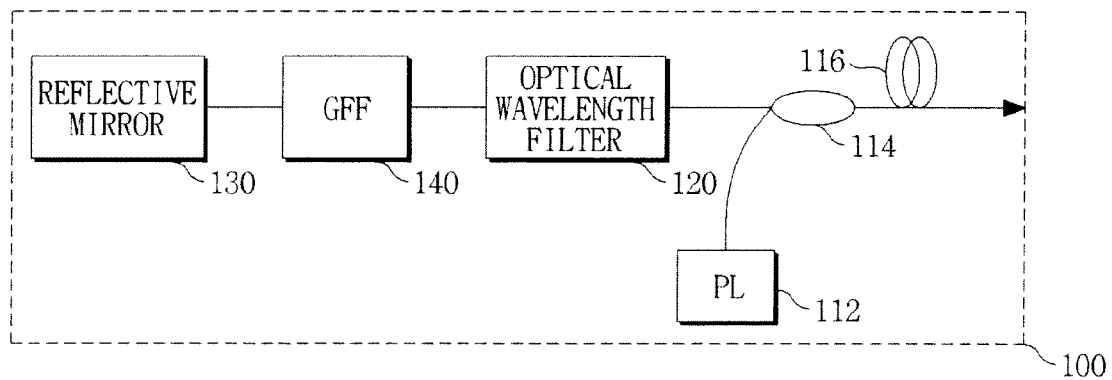
FIG. 5 is a diagram illustrating another exemplary seed light module 100 in FIG. 1.

FIG. 5 is a diagram illustrating another exemplary seed light module 100 in FIG. 1. More specifically, the seed light module 100 further includes a gain flattening filter (GFF) 140 between the optical wavelength filter 120 and the reflective mirror 130 to flatten the intensity of signals output as seed light by adjusting a loss in each channel. The seed light module 100 may employ a semiconductor optical amplifier instead of a fiber-optic (EDF, PDF) amplifier.

Figure 6:
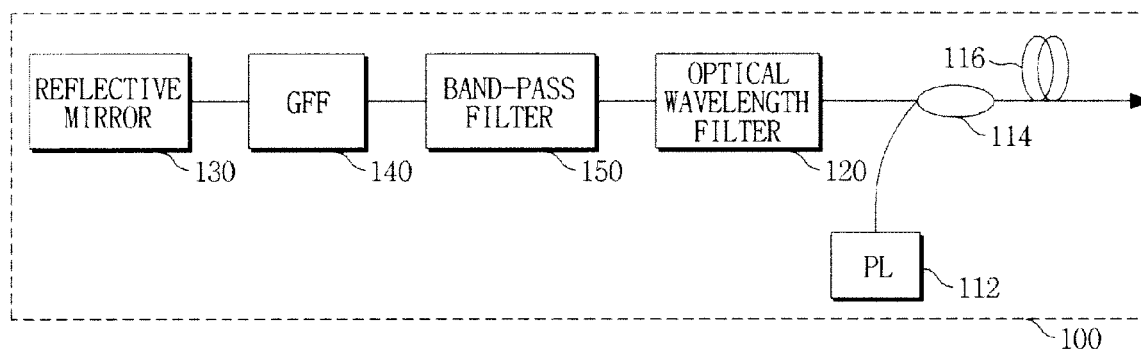
FIG. 6 is a diagram illustrating a further exemplary seed light module 100 in FIG. 1.
Figure 7:
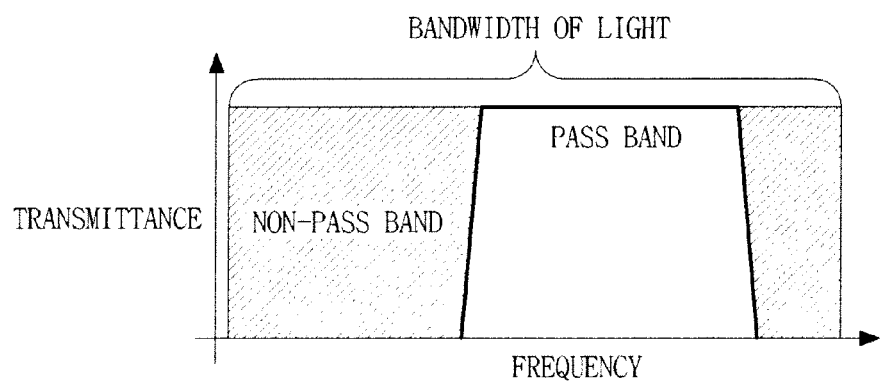
FIG. 7 illustrates a characteristic graph of a band-pass filter 150 in FIG. 6.

FIG. 6 is a diagram illustrating a further exemplary seed light module 100 in FIG. 1. More specifically, the seed light module 100 further includes a band-pass filter (BPF) 150 between the GFF 140 and the optical wavelength filter 120 of the seed light module 100 shown in FIG. 4 to adjust the number of channels of the seed light by transmitting only a signal with a specific frequency band as shown in FIG. 7. While the BPF 150 is disposed between the GFF 140 and the optical wavelength filter 120 in FIG. 6, the BPF 150 may be disposed somewhere between the reflective mirror 130 and the optical amplifier 110 without any change in the characteristic. The seed light module 100 may also use a semiconductor optical amplifier instead of a fiber-optic amplifier. Further, the seed light module 100 may not include the GFF 140, if necessary.

Figure 8:
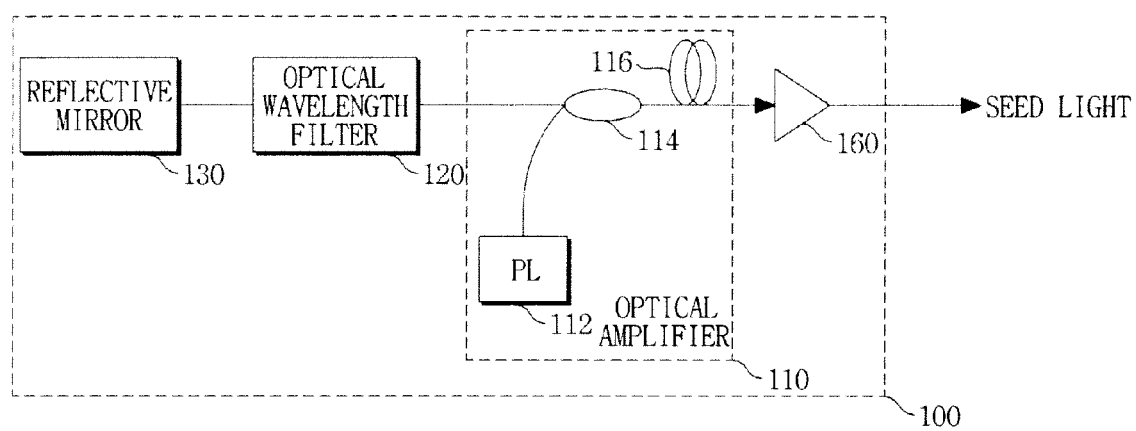
FIG. 8 is a diagram illustrating another exemplary seed light module 100 in FIG. 1.

FIG. 8 is a diagram illustrating another exemplary seed light module 100 in FIG. 1. The seed light module 100 further includes an optical amplifier 160 to amplify the seed light from the optical amplifier 110. The additional optical amplifier 160 may improve the output power of spectrum-sliced light.

On the other hand, for the left-direction spontaneous emission light emitted from the optical amplifier 110 of the seed light module 100 shown in FIG. 2 to be re-entered to the optical amplifier 110, an optical circulating element may be used instead of the reflective mirror 130.

Figure 9:
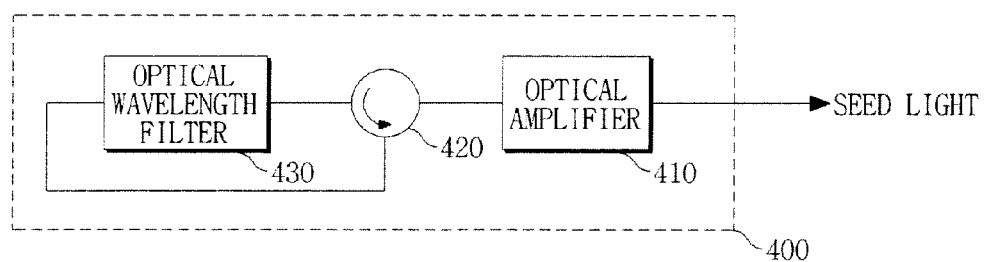
FIG. 9 is a diagram illustrating another exemplary seed light module 400.

FIG. 9 is a diagram illustrating another exemplary seed light module 400. More specifically, the seed light module 400 employs an optical circulating element instead of the reflective mirror 130.

The seed light module 400 includes an optical amplifier 410, an optical wavelength filter 430, and an optical circulating element 420. The optical amplifier 410 amplifies seed light. The optical wavelength filter 430 transmits broadband light, which is output in the opposite direction to the output direction of the seed light, at periodic frequency intervals. The optical circulating element 420 is disposed between the optical wavelength filter 430 and the optical amplifier 410. The optical circulating element 420 circulates light, which is spectrum-sliced through the optical wavelength filter 430, to the optical amplifier 410, and forwards the broadband light from the optical amplifier 410 to the optical wavelength filter 430. For reference, an optical circulator may be used as the optical circulating element 420. The optical amplifier 410 may use a fiber-optic amplifier as shown in FIG. 10 or a semiconductor optical amplifier.

Figure 10:
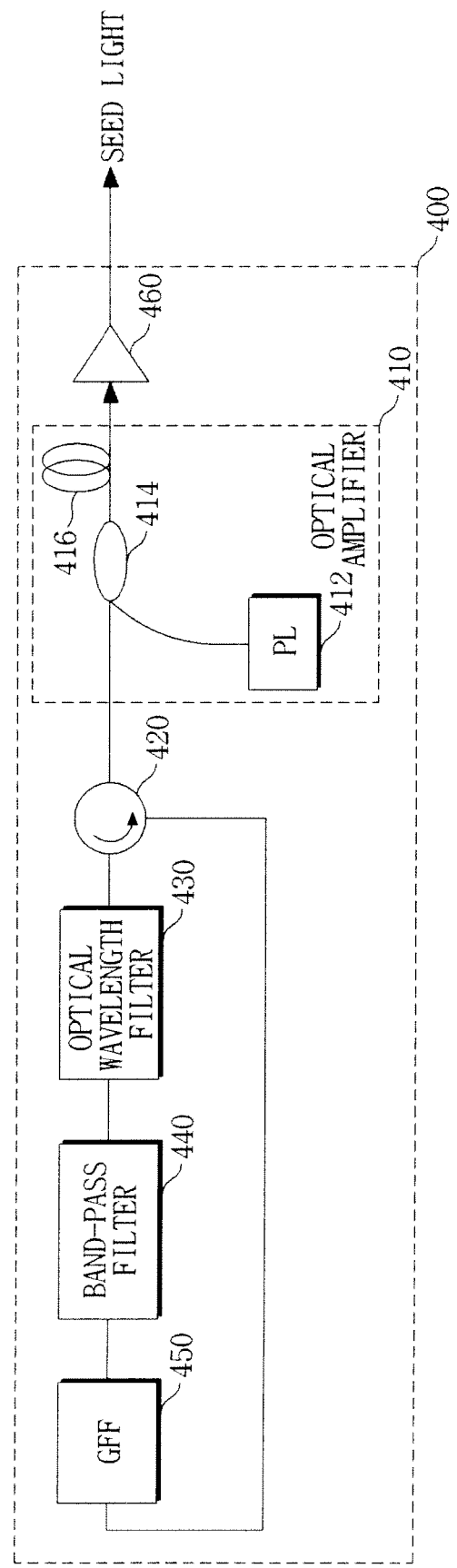
FIG. 10 is a diagram illustrating a more detailed configuration of the seed light module 400 shown in FIG. 9.

FIG. 10 is a diagram illustrating a more detailed configuration of the seed light module 400 shown in FIG. 9. More specifically, the seed light module 400 includes a GFF 450 and a BPF 440 which are inserted between the optical wavelength filter 430 and the optical circulator 420. Further, the optical amplifier 410 is a fiber-optic amplifier as shown in FIG. 3.

While the seed light module 400 includes the GFF 450 for flattening the intensity of signals output as the seed light by adjusting a loss in each channel, and the BPF 440 for adjusting the number of channels of the seed light by transmitting only a signal with a specific frequency bandwidth, both of which are disposed between the GFF 450 and the optical wavelength filter 430, in FIG. 10, the seed light module 400 may only include any one of them. Furthermore, an optical amplifier 460 is intended to improve the power of the spectrum-sliced light which is output from the optical amplifier 410. The optical amplifier 460 may be omitted.

The operation of the seed light module 400 will now be described with reference to FIG. 10. When light is entered by the pump light source 412, spontaneous emission light is emitted from the optical fiber 416 in the opposite direction (left) to the output direction (right) of the seed light. The light emitted from the optical amplifier 410 in left direction is input to the optical circulator 420 and forwarded to the optical wavelength filter 430. The optical wavelength filter 430 transmits the broadband light at periodic frequency intervals to output spectrum-sliced light. The BPF 440 transmits only a desired bandwidth of the spectrum-sliced light to the optical circulator 420 via the GFF 450. The optical circulator 420 forwards the desired bandwidth of spectrum-sliced light to the optical fiber 416. The desired bandwidth of spectrum-sliced light is amplified by the optical amplifier 460 and provided as the seed light.

As described above, also in case of the seed light module 400 employing the optical circulator 420, since the spontaneous emission light generated in the fiber-optic amplifier 410 is spectrum-sliced, re-entered to through the optical circulator 420, and provided as seed light, a loss in optical power caused by the spectrum slicing which occurs in the WDM MUX in the OLT may be avoided. As a result, it is possible to efficiently operate the WDM PON OLT.

Figure 11:
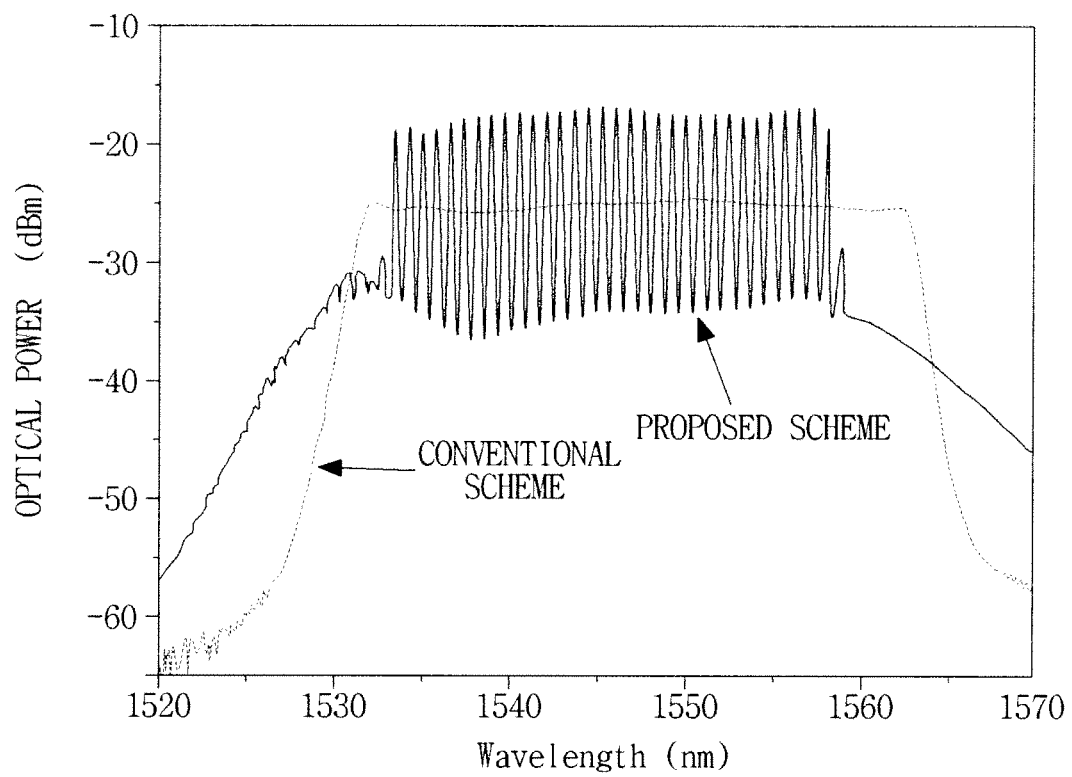
FIG. 11 is a graph illustrating output spectra of a conventional WDM PON and a WDM PON including the exemplary seed light module.

FIG. 11 is a graph illustrating output spectra of the exemplary seed light modules 100 and 400 and a conventional seed light module. As described above, since the exemplary seed light modules 100 and 400 each are configured to divide the spectrum of light and amplify the spectrum-sliced light, it is possible to avoid a loss in optical power caused by the spectrum slicing which occurs in the OLT of the WDM PON. Accordingly, it can be seen from FIG. 11 that the exemplary seed light module exhibits outstanding output performance over the existing broadband light source. Furthermore, since the exemplary seed light module employs the gain flattening filter to equalize powers in the divided spectra, wavelength-multiplexed spectrum-sliced light with uniform optical power may be obtained, if necessary.

As apparent from the above description, since the seed light module outputs the spectrum-sliced light, it is possible to avoid a loss in optical power caused by the spectrum slicing which occurs in the WDM MUX in the OLT on a communication link. As a result, it is possible to efficiently operate the WDM PON system including the exemplary seed light module.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A seed light module for a passive optical network, comprising:
   an optical amplifier to amplify seed light;
   an optical wavelength filter to transmit broadband light, which is output in opposite direction to an output direction of the seed light, at periodic frequency intervals;
   an optical circulating element disposed between the optical wavelength filter and the optical amplifier to circulate light which is spectrum-sliced through the optical wavelength filter to the optical amplifier and the optical circulating element to forward broadband light from the optical amplifier to the optical wavelength filter; and
   a gain flattening filter disposed between the optical wavelength filter and the optical circulating element to flatten intensity of signals which are output as the seed light before being input to the optical wavelength filter by adjusting a loss in each channel.

2. The seed light module of claim 1, further comprising a band-pass filter disposed between the gain flattening filter and the optical wavelength filter to adjust a number of channels of the seed light by transmitting only a specific frequency band.

3. The seed light module of claim 1, wherein the optical amplifier is a fiber-optic amplifier and comprises:
   an optical fiber made of an optical amplifying material;
   a pump light source to inject external light to the optical fiber to generate a carrier; and
   an optical coupler to guide light of the pump light source to the optical fiber.

4. The seed light module of claim 3, further comprising a semiconductor optical amplifier to amplify the seed light following the optical fiber.

5. The seed light module of claim 1, wherein the optical amplifier is a semiconductor optical amplifier.

6. The seed light module of claim 1, further comprising a band-pass filter disposed between the optical wavelength filter and the optical circulating element to adjust a number of channels of the seed light by transmitting only a specific frequency band.

7. The seed light module of claim 6, wherein the optical amplifier is a fiber-optic amplifier and comprises:
   an optical fiber made of an optical amplifying material;
   a pump light source to inject external light to the optical fiber to generate a carrier; and
   an optical coupler to guide light of the pump light source to the optical fiber.

8. The seed light module of claim 7, further comprising a semiconductor optical amplifier to amplify the seed light following the optical fiber.

9. The seed light module of claim 6, wherein the optical amplifier is a semiconductor optical amplifier.

* * * * *